United States Patent [19]

Shinjo

[11] Patent Number: 4,996,860
[45] Date of Patent: Mar. 5, 1991

[54] METHOD AND APPARATUS FOR MANUFACTURING ANCHOR BOLTS FOR CONCRETE

[75] Inventor: Katsumi Shinjo, Osaka, Japan

[73] Assignee: Yugenkaisha Shinjo Seisakusho, Osaka, Japan

[21] Appl. No.: 496,663

[22] Filed: Mar. 21, 1990

[30] Foreign Application Priority Data

Nov. 14, 1989 [JP] Japan ................................. 1-295788

[51] Int. Cl.[5] ........................ B21K 1/46; B21D 17/04; B21H 3/06
[52] U.S. Cl. ...................................... 72/88; 10/11 R; 10/27 R
[58] Field of Search ............. 10/10 R, 24, 27 R, 27 E, 10/11 R; 72/88, 90; 411/55, 57, 60, 61, 70

[56] References Cited

U.S. PATENT DOCUMENTS

| | | | |
|---|---|---|---|
| 3,044,332 | 7/1962 | Siebol | 72/90 |
| 4,365,495 | 12/1982 | Francis | 72/88 |
| 4,610,589 | 9/1986 | Bredal | 411/61 X |
| 4,770,581 | 9/1988 | Limbrick | 411/57 X |

FOREIGN PATENT DOCUMENTS

| | | | |
|---|---|---|---|
| 2414375 | 9/1979 | France | 10/27 R |
| 624738 | 8/1981 | Switzerland | 411/57 |

Primary Examiner—E. Michael Combs
Attorney, Agent, or Firm—Antonelli, Terry, Stout & Kraus

[57] ABSTRACT

A method and apparatus for manufacturing anchor bolts to be fixed on concrete structures, with the method comprising preliminarily heading a steel rod to form at an upper end thereof, a head having a tapered surface gradually tapering downwardly from the upper end and decreasing in diameter; forming the mail screw at the other end of rod by thread-rolling and simultaneously rolling a part adjacent to the head to form a rod-portion of a reduced diameter by gradually displacing a surface layer of the rod-portion inwardly and outwardly to give rise to an inner and outer transient swells respectively forming a stopper a tapered portion merging into the tapered surface of head; and loosely fitting and expansible sleeve on the rod-portion of reduced diameter, with the sleeve being made by die-cutting and bending a metal plate into a cylindrical shape of an outer diameter substantially equal to outer diameter of the screw. The apparatus includes a header forming the preliminary head, and a pair of rolling die assemblies each comprising a thread-rolling die to form the screw, a neck-rolling die combined therewith by a spacer and adapted to form the rod-portion of reduced diameter.

3 Claims, 7 Drawing Sheets

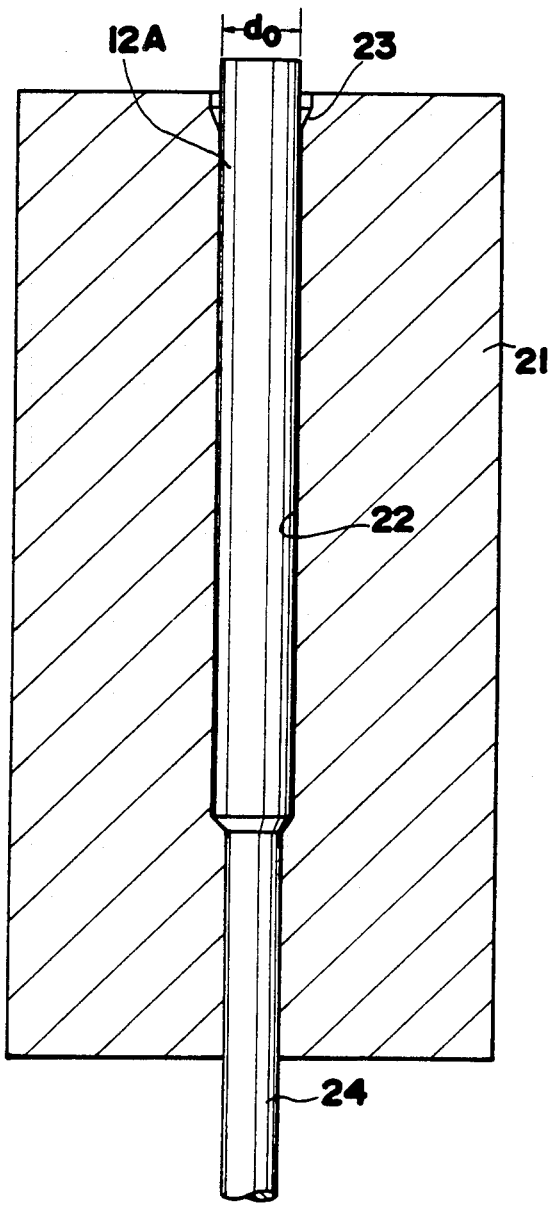
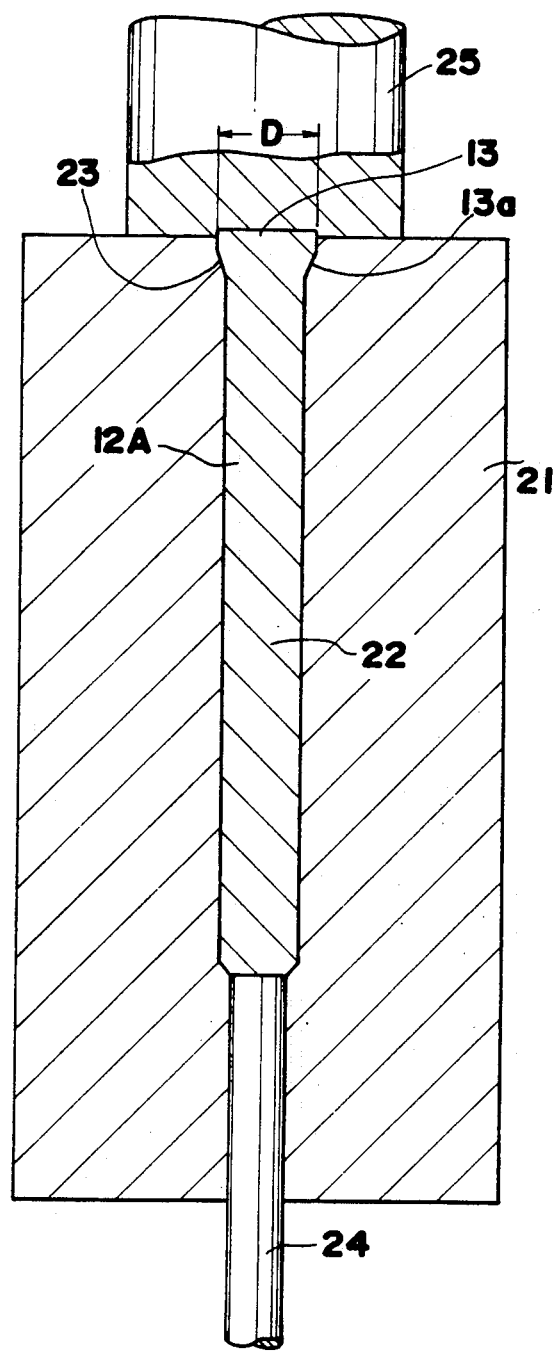

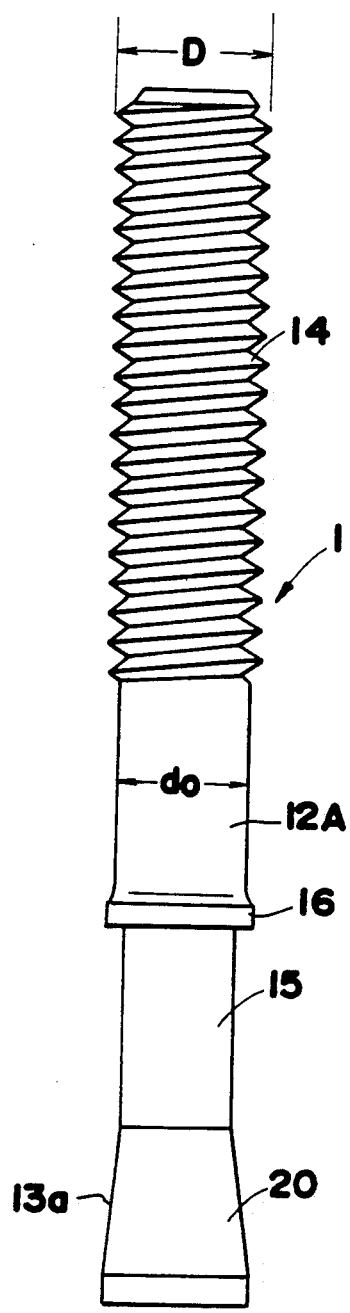
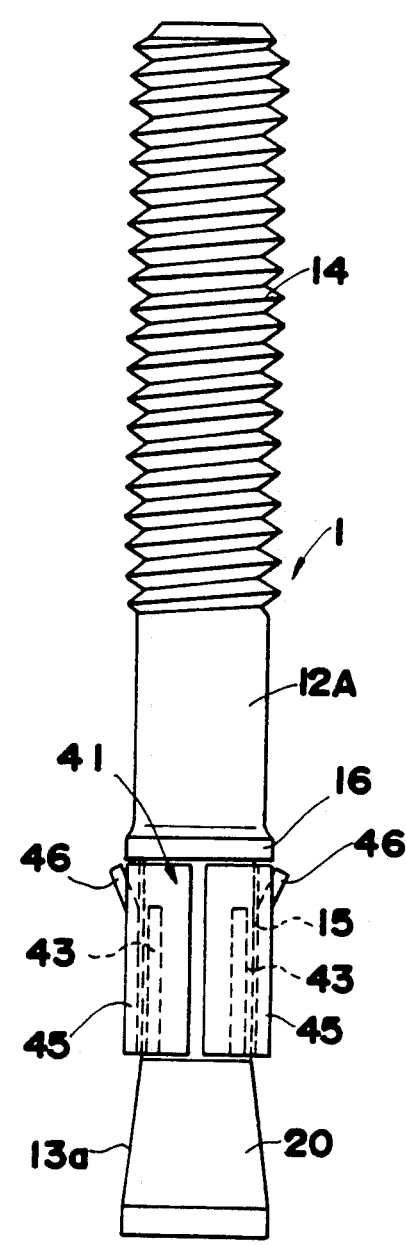

METHOD AND APPARATUS FOR MANUFACTURING ANCHOR BOLTS FOR CONCRETE

BACKGROUND OF THE INVENTION

1. Field of the Invention

The invention relates to a method for manufacturing anchor bolts which are used to fix various mechanical parts, devices or the likes on a concrete structure or concrete body such as wall, ceiling, floor or the like, and also relates to an apparatus used in the method.

2. Description of Prior Art

As shown in FIGS. 14 and 15, a prior art anchor bolt comprises an anchor body member 1 composed of a rod 2 provided with an expansion body 3 at its one end and a male screw thread 4 at its other end. A portion 5 of reduced diameter is formed adjacent to the expansion body 3, and an expansible sleeve 6 is mounted on the portion 5. The expansible sleeve 6 is made by die-cutting a thin metal plate and thereafter bending same into a cylindrical shape such that an outer diameter thereof is almost the same as that of the male screw thread 4. The expansible sleeve 6 is loosely fitted on the portion 5 of reduced diameter and has on its outer surface some scratching protrusions 7 which prevent the sleeve from being pulled out of a hole 9 in concrete body 8.

As is shown in FIG. 15, the anchor bolt is struck into the hole 9 of the concrete body 8, with its expansion body 3 positioned deepest in said hole. The scratching protrusions 7 of the expansible sleeve 6 engages with an inner surface of the hole 9. Then, a nut 10 put on the male screw thread 4 is tightly driven to secure an object 11 which is to be mounted on the concrete body. A pulling force thereby imparted to the anchor body 1 causes a tapered surface 3a of the expansion body 3 to forcibly expand the expansible sleeve 6, whereby said anchor body 1 is fastened to the concrete body 8.

The anchor bolt described above is simple in its structure wherein a diameter of the rod 2 of anchor body 1, a maximum diameter of the expansion body 3, the outer diameters of said male screw thread 4 and expansible sleeve 6 are almost the same. Therefore, the hole 9 drilled in the concrete body 8 can have a minimum diameter, which provides a great advantage to the related construction works.

It is, however, to be noted that the anchor body 1 has been manufactured from a raw rod 2A of a diameter equal to a diameter of thread of the male screw thread 4, by cutting or machining technique to form said enlarged head 3, portion 5 of reduced diameter and said male screw thread 4. Such a manufacture method is disadvantageous in that productivity is low, yield of good products is low and manufacture cost is high.

Recently, multistage cold-forging also has been applied to manufacture of the anchor body 1 in order to improve the productivity and to lower the manufacture cost. Manufacturing equipment for the multistage cold-forging is very expensive and needs many machine tools due to the multistage system so that a remarkable decrease in manufacturing cost cannot be looked for from this system.

SUMMARY OF THE INVENTION

An object of the present invention, which was made in view of the circumstances described above, is therefore to provide a method and an apparatus used therein which employ a simple but effective means suited to mass production of the described anchor bolts at a lower cost.

According to the invention, the method comprises preliminarily heading a steel rod to form at one end portion thereof a preliminary head having a tapered surface which gradually tapers, decreasing its diameter, from the preliminary head toward an inner portion of the steel which is of almost the same diameter as that of a male screw thread which is to be formed subsequently; of forming the male screw thread at the other end portion of the steel rod, by thread-rolling same, wherein an intermediate part adjacent to the preliminary head is rolled at the same time to form a rod-portion of reduced diameter adapted to be covered by an expansible sleeve, thereby a surface layer of the rod-portion being gradually displaced inwards to give rise to an inner transient swell and outwards to give rise to an outer transient swell, in an axial direction of the steel rod, the inner transient swell forming a stopper for the expansible sleeve, and the outer transient swell forming a tapered portion which merges into the tapered surface of the preliminary head to thereby form an expansion body of a frustum shape; and of loosely fitting the expansible sleeve on the rod-portion of reduced diameter, with the expansible sleeve being made by die-cutting and bending a thin metal plate into a cylindrical shape of an outer diameter substantially equal to an outer diameter of the male screw thread.

The expansible sleeve is preferably of a structure such that a plurality of deep notches extend from an end facing the expansion body toward the other end of said sleeve in axial direction thereof, and a plurality of spring tongues extending outwardly at said other end facing the stopper. The spring tongues are formed by partially slitting the other end and by bending parts disposed between adjacent slits outwardly in a radial direction.

According to the invention, the apparatus for manufacturing an anchor body of anchor bolts comprises a header adapted to press one end portion of a steel rod to thereby form a preliminary head having a tapered surface which gradually tapers, decreasing its diameter, from the preliminary head toward an inner portion of the steel rod; and a pair of rolling dice assemblies each comprising a neck-rolling die which is overlaid upon and fixedly secured to a thread-rolling die with a spacer interposed therebetween, with the thread-rolling die adapted to form a male screw thread on the other end portion of the steel rod. The neck-rolling die is adapted to form a rod-portion of reduced diameter and is constructed such that an upper slope and a lower slope constitute one of vertical forging surfaces opposed in said pair of assemblies, The vertical forging surface is formed as a sharp ridge located foremost in a direction in which the assembly moves, and a rear width of the forging surface gradually increases with widths of the upper and lower slopes gradually decreasing at the same time. A rear portion of the upper slope gradually merges into a further slope which is inclined at the same angle as the tapered surface of the preliminary head, while a rear portion of the lower slope gradually merges into a stepped recess which is adapted to form a stopper at an end of the rod-portion of reduced diameter.

The header and the pair of rolling die assemblies combined therewith are thus suited for the mass production of the anchor body. The expansible sleeve also can be mass-produced by die-cutting and bending the thin metal plate.

It will now be apparent that the method in the invention is composed of two steps, which are the step of preliminarily heading the steel rod of the diameter substantially equal to that of the core diameter of rolled male screw, by thread an ordinary header, and the step of subsequently rolling said rod by a pair of rolling die assemblies. Thus, it has become possible to manufacture the anchor body on a scale of mass production and low in price. The method remarkably reduces the loss of raw material in the steps, thereby sharply reducing manufacture cost.

The apparatus in the invention is of a simpler structure which can be built inexpensively and which nevertheless makes it easier to carry out the method in the invention.

Further, as described above, the expansible sleeve which is to be combined with the anchor body is made by die-cutting and bending the thin metal plate to comprise the spring tongues which are formed by partially slitting one end portion and by subsequently bending the parts between the adjacent slits outwardly and radially. Such a structure of the expansible sleeve is advantageous not only in that it can be manufactured simply and low in cost, but also in that it can be inserted smoothly into a hole formed in a concrete structure and be expanded easily therein whereby construction works are rendered easier.

BRIEF DESCRIPTION OF THE DRAWINGS

The invention will be described more in detail referring to the drawings, in which:

FIG. 1 is a vertical cross-section of a header which is utilized to form a preliminary head of an anchor body in a method according to the invention;

FIG. 2 is also a vertical cross-section of the header in an operated state;

FIG. 10 is a front elevation of said anchor body which is completely formed;

FIG. 11 is also a front elevation of an anchor bolt comprising the anchor body;

DETAILED DESCRIPTION OF PREFERRED EMBODIMENTS

Figure 3:
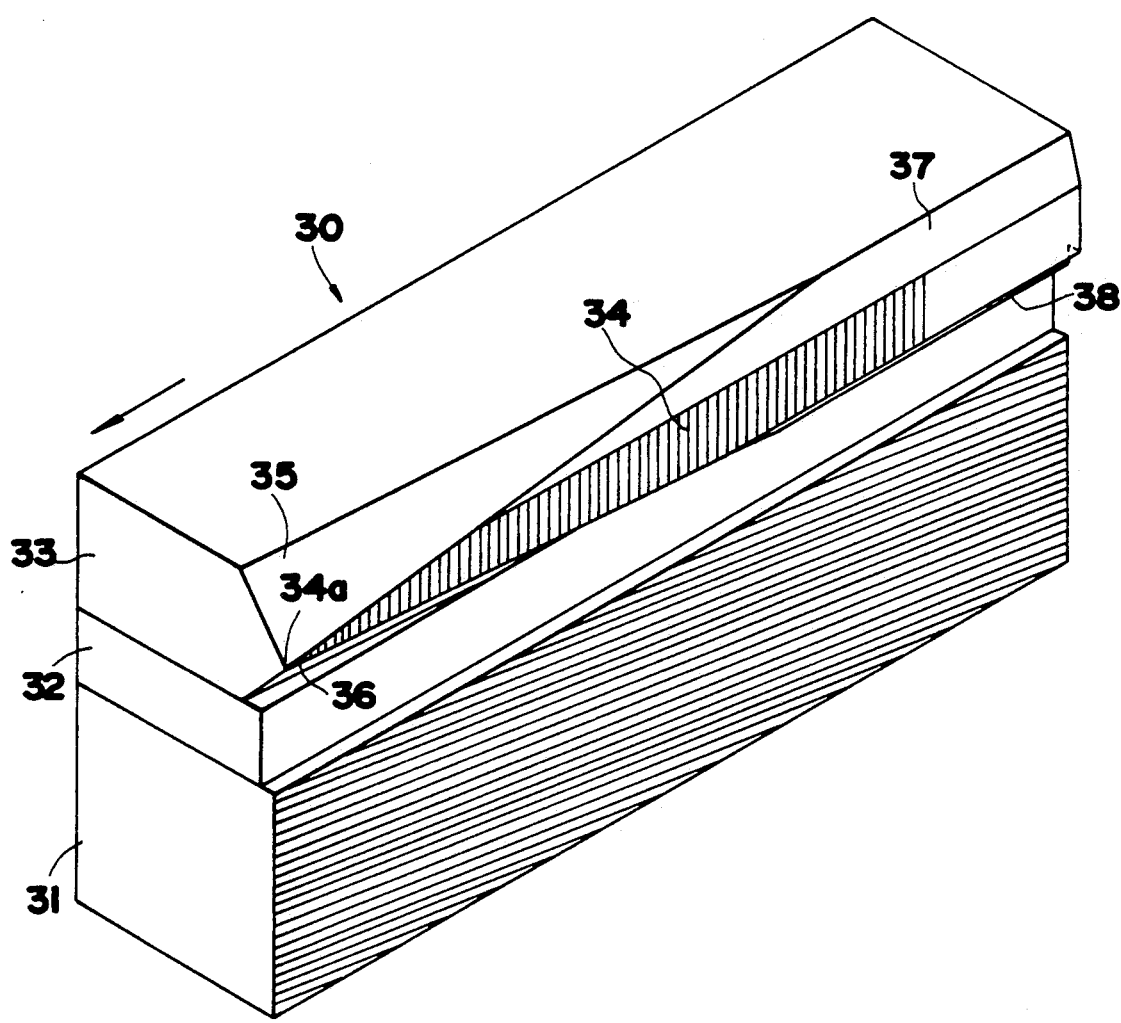
FIG. 3 is a perspective view of a rolling die assembly used to form the anchor body by rolling technique in the method.

FIGS. 1 and 2 illustrate a header which is used to perform a first step of preliminarily heading a steel rod or anchor bolt blank. A header die 21 comprises an aperture 22 into which the steel rod 12A is inserted A head-forming recess 23 is located at an upper end of the aperture 22, and a knock-out pin 24 is fitted in a hole connected to a bottom of said aperture 22.

The steel rod 12A is of a diameter d substantially equal to a core diameter of a male screw thread 14 formed by rolling technique as shown in FIG. 10. FIG. 2 illustrates a heading punch 25 presses an end of the steel rod 12A of a given size protruding from the aperture 22 of header die 21. A preliminary head 13 is formed by the head-forming recess 23 with the preliminary head comprising a tapered surface 13a which gradually tapers, decreasing its diameter, from the preliminary head 13 toward an inner portion of the rod 12A. At this preliminarily forming step, a maximum diameter of the preliminary head 13 is substantially equal to an outer diameter D of the male screw thread 14.

Figure 5:
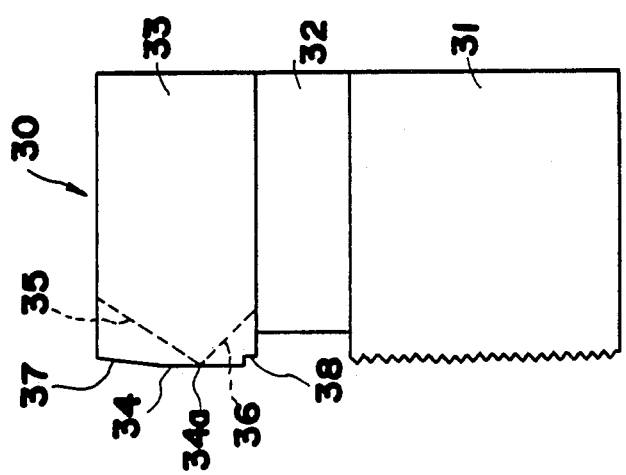
FIG. 5 is a side elevation of said rolling die assembly.
Figure 4:
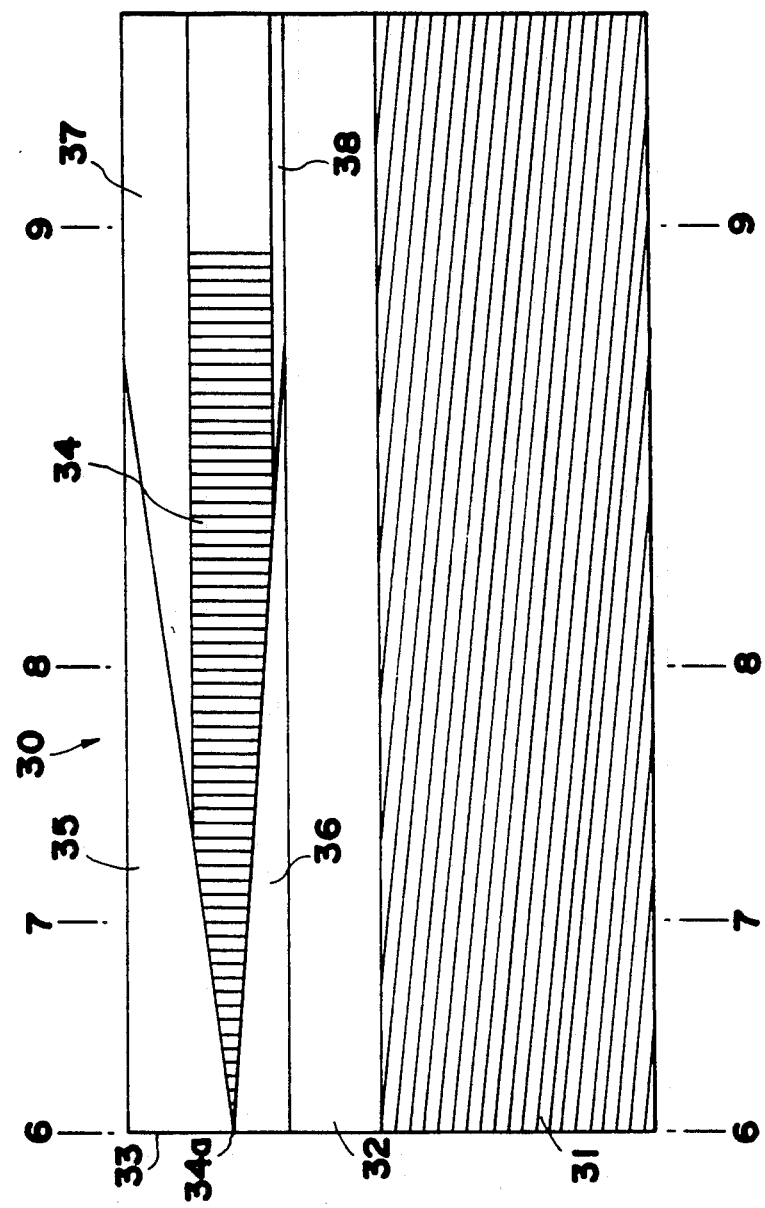
FIG. 4 is a front elevation of the rolling die assembly.

As shown in FIGS. 3 to 5 a rolling die assembly 30 comprises a thread-rolling die 31 adapted to form the male screw thread 14 at the other end portion of said steel rod 12A which has undergone the preliminarily forming step, a spacer 32 overlying the thread-rolling die 31, and a neck-rolling die 33 overlying the spacer 32 so as to be fixedly secured to the thread-rolling die 31. The neck-rolling die 33 is of a shape such that a rod-portion 15 of reduced diameter is formed as illustrated in FIG. 10. The neck-rolling die 33 has an upper slope 35 and a lower slope 36 which constitute one of vertical forging surfaces 34 opposed in a pair of rolling die assemblies 30. The vertical forging surface 34 is formed as a sharp ridge located foremost in a direction denoted by an arrow in FIG. 3 in which direction the assembly moves. A rear width of the forging surface 34 gradually increases, with widths of the upper slope 35 and lower slope 36 gradually decreasing at the same time. A rear portion of the upper slope 35 gradually merges into a further slope 37 which is inclined at the same angle as the tapered surface 13a of the preliminary head 13, while a rear portion of the lower slope 36 gradually merges into a stepped recess 38 which is adapted to form a stopper 16 at an end of the rod-portion 15 of reduced diameter.

A manner in which the thread-rolling dies 31 and 31 form the male screw thread 14 at said other end of steel rod 12A is a common practice in the conventional thread-rolling process. However, the sharp ridges 34a and 34a of the neck-rolling dies 33 and 33 in the invention grip a steel rod portion near the preliminary head 13, just before the thread-rolling commences in the process, whereby an annular groove 15a is formed at first at the steel rod portion.

Figure 8:
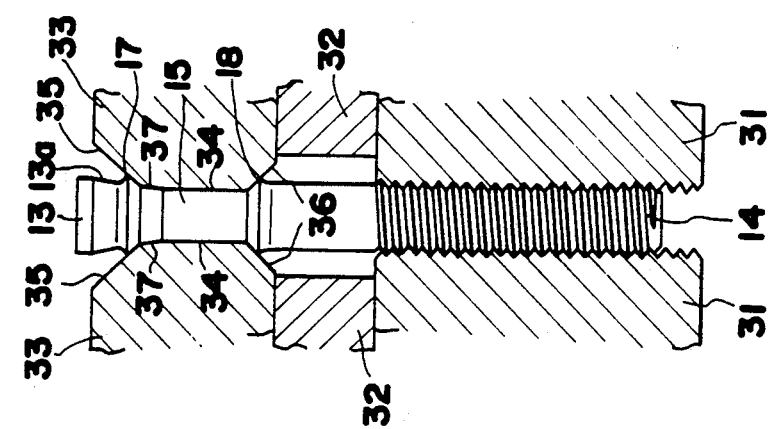
FIG. 8 is a partial cross-sectional view of a further stage in the rolling technique of the method of the present invention taken along the line 8—8 in FIG. 4.
Figure 7:
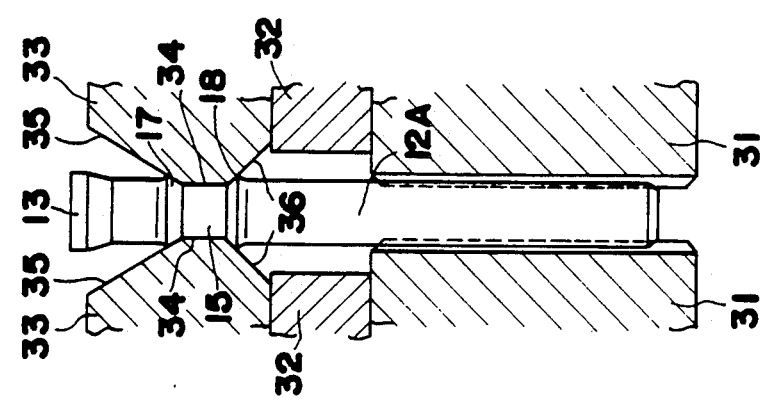
FIG. 7 is a partial cross-sectional view of another stage in the rolling technique of the method of the present invention taken along the line 7—7 in FIG. 4.
Figure 6:
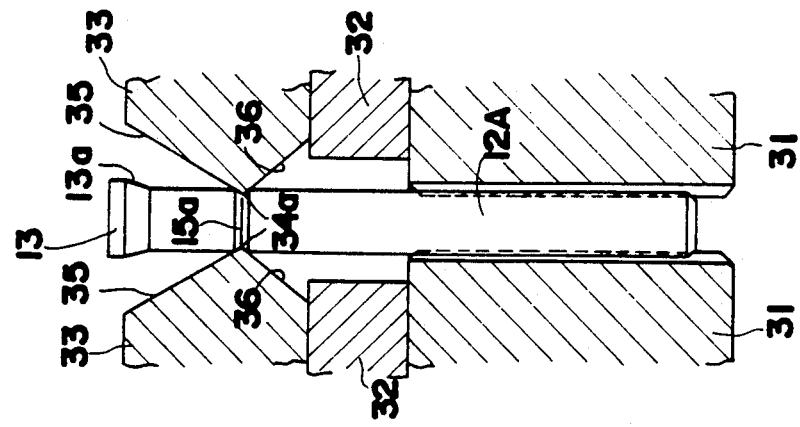
FIG. 6 is a partial cross-sectional view of a stage in the rolling technique method of the present invention taken along the line 6—6 in FIG. 4.

As the rear width of the forging surfaces 34 and 34 opposed to each other increases gradually, a width of the annular groove also gradually increases in an axial direction of the rod. Thus, the rod-portion 15 of reduced diameter 15 is gradually formed as is shown in FIG. 7. This rolling of said steel rod portion gives rise to an outer transient swell 17 on surface thereof as well as an inner transient swell 18, which starts to move in opposite axial directions of the steel rod. The further slope 37 subsequently assist the outer swell 17 to move outwardly, as is shown in FIG. 8.

Figure 9:
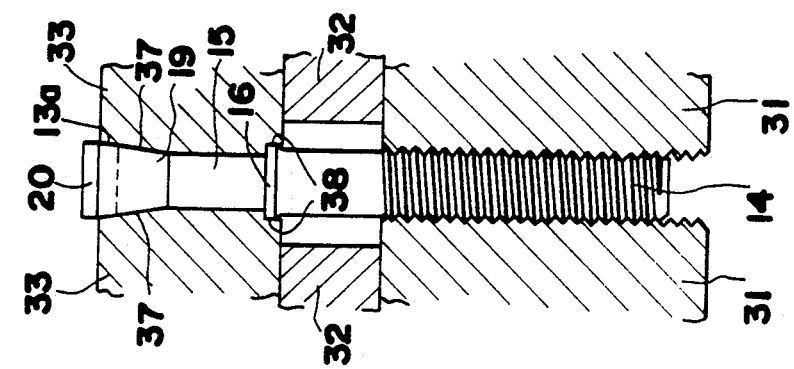
FIG. 9 is a partial cross-sectional view of a still further stage in the rolling technique of the method of the present invention taken along the line 9—9 in FIG. 4.

Thereafter, a rear (right-hand in FIG. 4) region of the neck-rolling dies 33,33 force the inner transient swell 18 into the stepped recess 38. As a result, the stopper 16 of a flange-like shape is produced to have a diameter substantially equal to the outer diameter of the male screw thread 14, as shown in FIG. 9. On the other hand at the same time, the further slope 37 in the rear or right-hand region forcibly deforms the outer transient swell 17 into a tapered portion 19 which merges into and adjoin the tapered surface 13a of the preliminary head 13, so as to form an integral tapered region. The tapered surface 13a is thus elongated to an end of rodportion 15, which is of reduced diameter and has a desirable length, whereby an expansion body 20 of a predetermined frustum shape is provided for the anchor body 1 as illustrated in FIG. 10.

Finally, an expansible sleeve 41 shown in FIG. 11 is then fitted loosely on the rod-portion 15 of reduced diameter of the thus produced anchor body 1.

Figure 12:
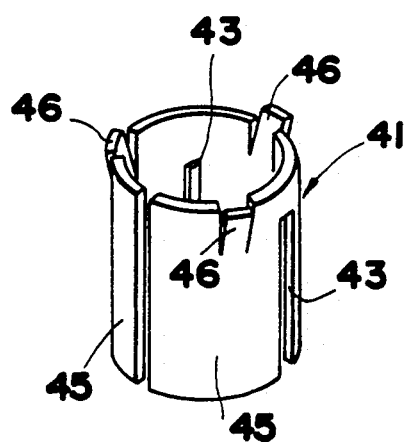
FIG. 12 is a perspective view of an expansible sleeve.
Figure 13:
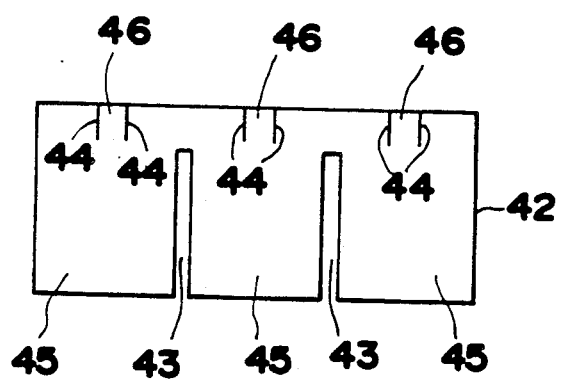
FIG. 13 is a development of the expansible sleeve.
Figure 16:
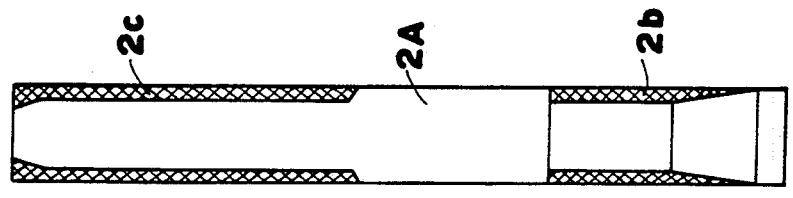
FIG. 16 illustrates a manufacturing process for an anchor body of the prior art anchor bolt of FIG. 14.
Figure 15:
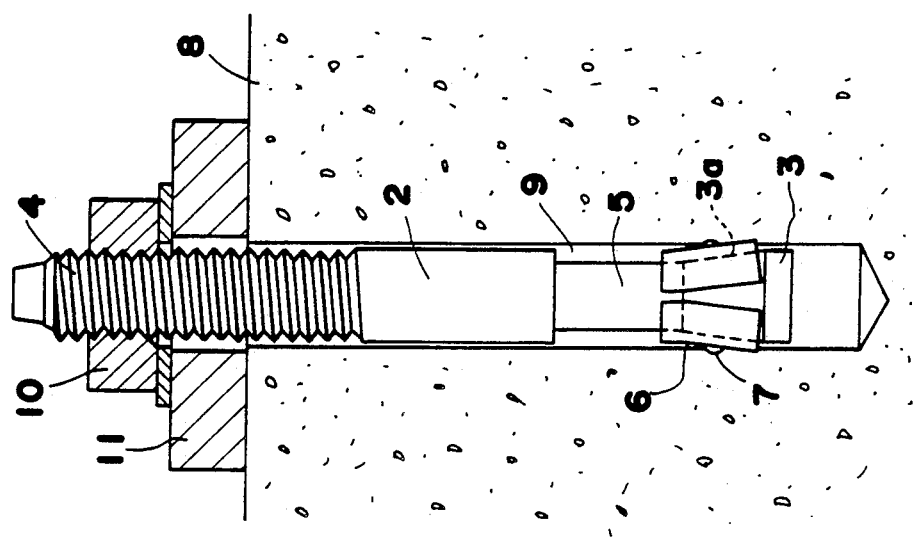
FIG. 15 also shows the prior art anchor bolt of FIG. 14 in use, partially in cross-section.
Figure 14:
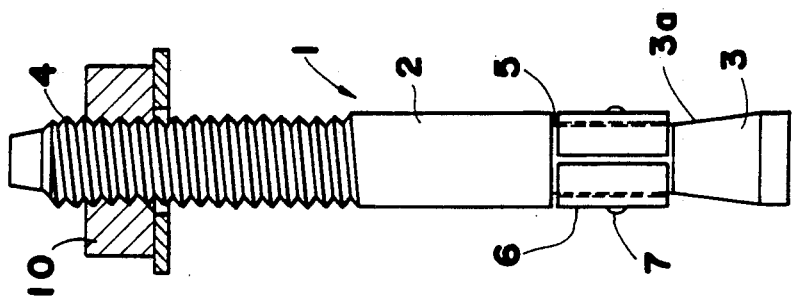
FIG. 14 is a front elevation of a prior art anchor bolt.

The expansible sleeve 41 is made of a thin rectangular metal plate 42, as illustrated in FIG. 13. Deep notches 43 are formed to extend from an edge to the other edge. Pairs of slits 44 spaced apart an adequate distance are also formed at the other edge. Then, said metal plate 42 is bent into a cylindrical shape of an outer diameter substantially equal to that of the male screw thread 14, as shown in FIG. 12. Expansible tongues 45 are each provided between two adjacent deep notches 43 or between one such notch and a side edge of the metal plate 42. Parts of the metal plate 42 which are disposed between the paired adjacent slits 44 are bent outwardly in a radial direction so as to form spring tongues 46. The other edge on which the spring tongues 46 are located engages with and is retained by the stopper 16 when this expansible sleeve 41 is loosely fitted on the rod-portion 15 of reduced diameter.

Such an expansible sleeve 41 is less rigid but has a sufficient spring-characteristics. Consequently, it does not exert any strong resistance when inserted in the hole 9 of concrete structure so that the pushing of said sleeve by any tool or part thereof such as a grip of hammer will be enough to set the expansible sleeve 41 in position within the hole 9. Further, such an expansible sleeve 41 is ready to expand in the hole 9 and is so securely fixed therein that it cannot be withdrawn therefrom.

What is claimed is:

1. A method for manufacturing an anchor bolt, the method comprising the steps of: preliminarily heading a first end of a steel rod to form a preliminary head having a tapered surface which gradually tapers, decreasing in diameter, from said first end toward an inner portion of the steel rod; thread rolling a second end of said steel rod to form a male screw thread on said steel rod having a core diameter substantially equal to the decreased diameter of the tapered surface; rolling an intermediate portion of the steel rod adjacent to the preliminary head simultaneously with the thread rolling to form a rod-portion of reduced diameter by gradually inwardly displacing a surface layer of the intermediate portion causing an inner transient swell in an axial direction of the steel rod to form a stopper and radially outwardly displacing the surface layer causing an outer transient swell to form a tapered portion merging into the tapered surface of the preliminary head to thereby form a frustum-shaped expansion body; die-cutting and bending a thin metal plate into a cylindrical shaped expansible sleeve having an outer diameter substantially equal to an outer diameter of the male screw thread, a plurality of deep notches extending axially from one end of the expansible sleeve toward a second end thereof, and a plurality of spring tongues respectively disposed between adjacent deep notches; and loosely fitting the expansible sleeve on the intermediate portion with the plurality of tongues being engageable with and retained by the stopper and the first end of the expansible sleeve cooperating with the expansion body.

2. A method for manufacturing an anchor bolt according to claim 1, wherein said plurality of spring tongues are formed by partially slitting said second end of said expansible sleeve and bending portions of the metal plate disposed between adjacent slits outwardly in a radial direction.

3. An apparatus for manufacturing an anchor body of an anchor bolt, the apparatus comprising: a header means including a pair of header dies adapted to press a first end of a steel rod to form a preliminary head having a tapered surface which gradually tapers, decreasing in diameter, from the first end toward an inner portion of the steel rod;

a pair of rolling die assemblies each including a neck-rolling die overlying and fixedly secured to a thread-rolling die with a spacer interposed therebetween, the thread-rolling die being adapted to form a male screw thread on a second end of the steel rod opposite to the first end thereof, and the neck-rolling die being adapted to form a reduced diameter rod-portion;

wherein the neck rolling dies each include an upper slope, a lower slope, and a vertical forging surface formed with a sharp edge located foremost of the respective neck rolling dies in a direction of movement of the rolling die assemblies, a rear width of said vertical forging surface of each of said neck rolling dies gradually increases with widths of the upper and lower slopes gradually decreasing at the same time, and wherein a rear portion of the upper slope gradually merges into a further slope inclined at the same angle as the tapered surface of the preliminary head so as to form a frustum shaped expansion body, and a rear portion of the lower slope of each of the neck-rolling dies gradually merges into a stepped recess adapted to form a stopper at an end of the reduced diameter rod-portion.

* * * * *